United States Patent
Vandewinckel et al.

(10) Patent No.: US 12,071,540 B2
(45) Date of Patent: Aug. 27, 2024

(54) POLYMER FILAMENTS FOR ADDITIVE MANUFACTURING HAVING REDUCED EMISSIONS

(71) Applicant: Xerox Corporation, Norwalk, CT (US)

(72) Inventors: Judith Vandewinckel, Livonia, NY (US); Mark Mercandetti, Victor, NY (US); Angela Schnuerch, Naples, NY (US); James Winters, Alfred Station, NY (US)

(73) Assignee: Xerox Corporation, Norwalk, CT (US)

(*) Notice: Subject to any disclaimer, the term of this patent is extended or adjusted under 35 U.S.C. 154(b) by 240 days.

(21) Appl. No.: 17/335,697

(22) Filed: Jun. 1, 2021

(65) Prior Publication Data
US 2022/0380592 A1    Dec. 1, 2022

(51) Int. Cl.
*C08L 55/02*    (2006.01)
*B29C 64/118*    (2017.01)
(Continued)

(52) U.S. Cl.
CPC ............ *C08L 55/02* (2013.01); *B29C 64/118* (2017.08); *B33Y 70/00* (2014.12); *B33Y 70/10* (2020.01); *C08K 11/005* (2013.01); *C08L 97/02* (2013.01)

(58) Field of Classification Search
CPC ......... C08L 55/02; B33Y 70/10; B33Y 10/00; B33Y 70/00; C08K 11/005; B29C 64/118; D01F 1/10
See application file for complete search history.

(56) References Cited

U.S. PATENT DOCUMENTS

2009/0100655 A1    4/2009    Hung et al.
2017/0260653 A1    9/2017    Ahn et al.

FOREIGN PATENT DOCUMENTS

CN    107586441 A    1/2018
CN    109135221 A    1/2019
(Continued)

OTHER PUBLICATIONS

C. C. Kuo et al., Composites Part B 86 (2016) 36-39 (Year: 2016).*
(Continued)

*Primary Examiner* — Marc S Zimmer
*Assistant Examiner* — Surbhi M Du
(74) *Attorney, Agent, or Firm* — Vorys, Sater, Seymour and Pease LLP (57) ABSTRACT

Compositions include polymer filaments compatible with fused filament fabrication, comprising: a thermoplastic polymer; and a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis. Methods for forming a polymer filament compatible with fused filament fabrication may comprise: forming a melt blend comprising a thermoplastic polymer and a bio-based additive; and extruding the melt blend and cooling to form a polymer filament comprising the bio-based additive admixed with the thermoplastic polymer. The bio-based additive is present in an effective amount to decrease total volatile organic compound (TVOC) emissions under additive manufacturing conditions, as determined by gas chromatography and measured relative to the thermoplastic polymer alone, by at least about 10% on a weight basis.

7 Claims, 4 Drawing Sheets

(51) Int. Cl.
  *B33Y 70/00* (2020.01)
  *B33Y 70/10* (2020.01)
  *C08K 11/00* (2006.01)
  *C08L 97/02* (2006.01)

(56) References Cited

FOREIGN PATENT DOCUMENTS

| | | | |
|---|---|---|---|
| CN | 111674045 A | 9/2020 | |
| CN | 112608576 A | 4/2021 | |
| DE | 10029203 A1 * | 1/2002 | ............ B29B 9/14 |
| KR | 101400101 B1 * | 5/2014 | |
| KR | 20200071816 A | 6/2020 | |
| WO | 2019147896 A1 | 8/2019 | |
| WO | 2020036638 A1 | 2/2020 | |
| WO | WO-2020069850 A1 * | 4/2020 | ............ B32B 27/08 |

OTHER PUBLICATIONS

T. G. Ngo et al., Composites Part B 143 (2018) 172-196 (Year: 2018).*

Li et al. From brown to colored: Polylactic acid composite with micro/nano-structured white spent coffee grounds for three-dimensional printing, International Journal of Biological Macromolecules 174 (2021), 300-308, Available online Jan. 30, 2021, attached. (Year: 2021).*

Naskar et al. Poly(ethylene oxide)-Assisted Macromolecular Self-Assembly of Lignin in ABS Matrix for Sustainable Composite Applications, ACS Sustainable Chem. Eng. Mar. 2015, 3070-3076 (Year: 2015).*

Liu et al. Biorenewable polymer composites from tall oil-based polyamide and lignin-cellulose fiber, J. Appl. Polym. Sci. DOI: 10.1002/APP.42592 (Year: 2015).*

Qaiss et al. Thermo-mechanical performances of polypropylene biocomposites based on untreated, treated and compatibilized spent coffee grounds, Composites Part B 149 (2018) 1-11. (Year: 2018).*

Sagedhi et al. Study on Morphological, Rheological and Physico/Mechanical Behavior of SEBS/CaCO3 Nanocomposite; Fibers and Polymers 2013, vol. 14, No. 4, 556-565 (Year: 2013).*

Wound Up Coffee-Filled PLA Filament, 3D-Fuel, Sep. 1, 2020.

Buzzed Beer-Filled PLA Filament, 3D-Fuel, Sep. 1, 2020.

Extended European Search Report for corresponding EP Application No. 22173757.0 mailed Oct. 17, 2022.

* cited by examiner

POLYMER FILAMENTS FOR ADDITIVE MANUFACTURING HAVING REDUCED EMISSIONS

FIELD

The present disclosure generally relates to additive manufacturing and, more particularly, polymer filaments compatible with fused filament fabrication that afford decreased emission of volatile organic compounds (VOCs) during printing.

BACKGROUND

Additive manufacturing, also known as three-dimensional (3D) printing, is a rapidly growing technology area. Although additive manufacturing has traditionally been used for rapid prototyping activities, this technique is being increasingly employed for producing commercial and industrial parts in any number of complex shapes. Additive manufacturing processes typically operate by building a part layer-by-layer, for example, by 1) depositing a stream of molten printing material obtained from a continuous filament or 2) sintering powder particulates of a printing material using a laser. The layer-by-layer deposition usually takes place under control of a computer to deposit the printing material in precise locations based upon a digital three-dimensional "blueprint" of the part to be manufactured, with consolidation of the printing material taking place in conjunction with deposition to form the printed part. The printing material forming the body of a printed part may be referred to as a "build material" herein.

Additive manufacturing processes employing a stream of molten printing material for part formation are sometimes referred to as "fused deposition modeling" or "fused filament fabrication" processes. Molten printing material is formed by heating a thermoplastic polymer filament, which is then deposited layer-by-layer and coalesced to form a consolidated part having a specified shape. Other additive manufacturing techniques rely on heating to consolidate polymer particulates and may include, for example, powder bed fusion (PBF), selective laser sintering (SLS), electron beam melting (EBM), binder jetting and multi jet fusion (MJF), vat photopolymerization, directed energy deposition, and the like.

As additive manufacturing techniques become increasingly ubiquitous in commercial, scholastic, and household settings, there is increasing focus on enhancing operational safety. One issue that may be encountered in these techniques is the production of volatile organic compounds (VOCs), especially while heating the printing material, such as polymer filaments, polymer particulates, or polymer sheets at least to their softening temperature for extrusion, printing, and consolidation during additive manufacturing and similar processes. Thermoplastic polymers containing styrene or acrylic monomer units, such as poly(acrylonitrile-butadiene-styrene) (ABS), may liberate especially hazardous VOCs. To lessen potential health impacts, additive manufacturing units may be fitted with an air filter and/or may be operated in ventilated workspaces. However, these measures may be cumbersome and not applicable in all settings.

SUMMARY

The present disclosure relates to bio-based additives for reducing VOC emissions during additive manufacturing and methods of manufacturing printing materials containing bio-based additives.

In some aspects, polymer filaments compatible with fused filament fabrication comprise: a thermoplastic polymer; and a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis.

In some aspects, methods for forming a polymer filament compatible with fused filament fabrication comprise: forming a melt blend comprising a thermoplastic polymer and a bio-based additive; and extruding the melt blend and cooling to form a polymer filament comprising the bio-based additive admixed with the thermoplastic polymer; wherein the bio-based additive is present in an effective amount to decrease total volatile organic compound (TVOC) emissions under additive manufacturing conditions, as determined by gas chromatography and measured relative to the thermoplastic polymer alone, by at least about 10% on a weight basis.

In some aspects, additive manufacturing processes comprise: providing a polymer filament comprising a thermoplastic polymer and a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis; heating the polymer filament above a softening temperature of the thermoplastic polymer to form a softened polymer material; and depositing the softened polymer material layer by layer to form a printed part.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

The present disclosure generally relates to additive manufacturing and, more particularly, polymer filaments compatible with fused filament fabrication that afford decreased emission of volatile organic compounds (VOCs) during printing.

Additive manufacturing is a growing technology area that may utilize a variety of powder particulate and filament-based printing materials. While the number of available printing materials is rapidly expanding, the range of suitable polymers remains less than those available for competing manufacturing techniques, such as injection molding. With increasing use in commercial, scholastic and household settings, increased emphasis has been placed upon environmental health and safety associated with additive manufacturing processes. Since additive manufacturing processes may involve heating a polymer feedstock to borderline degradation temperatures during deposition and consolidation, release of aerosolized particulates and volatile organic compounds (VOCs) has become a recently recognized concern. Although VOCs and particulate emissions may be addressed with adequate ventilation and filtering, doing so may be cumbersome or costly in some instances. Moreover, operators may be unaware that such safety measures are needed for some printing materials, and in non-industrial settings, ventilation may not be economically feasible and air quality may be more difficult to monitor and control.

The present disclosure demonstrates that VOC emissions may be surprisingly decreased during additive manufacturing, such as during fused filament fabrication, through inclusion of one or more bio-based additives within a polymer filament. Without being limited by any particular theory, it is believed that the bio-based additives provide a carbon source that may effectively sequester VOCs and decrease their release into the surroundings. Advantageously, suitable bio-based additives may include various high-volume bio-waste streams from manufacturing processes that might otherwise be discarded to a landfill or require time-consuming bio-recycling operations, such as composting. Suitable bio-based additives may include, for example, coffee grounds and/or brewer's spent grain. By incorporating such bio-based additives in a polymer filament suitable for additive manufacturing, the environmental impact of the additive manufacturing process may be improved while also taking forward steps to a circular economy and more efficient use of resources. As a still further advantage, polymer filaments having a bio-based additive combined therewith may continue to expand the breadth of polymer materials available for use in various additive manufacturing processes.

Terms used in the description and claims herein have their plain and ordinary meaning, except as modified by the description below.

As used herein, the term "thermoplastic polymer" refers to a polymer material that softens and hardens reversibly on heating and cooling. Thermoplastic polymers are inclusive of thermoplastic elastomers.

As used herein, the term "total volatile organic compounds" (TVOC) is used to describe a group of organic compounds that are present in air emissions or ambient air. TVOC is a summation of the contribution from various classifications of organic compounds emitted from a sample, including: very volatile organic compounds (VVOC) having a typical boiling point of about 0° C. to about 100° C. and a carbon number of less than 6; volatile organic compounds (VOC) having a typical boiling point of about 100° C. to about 260° C. and a carbon number ranging from 6 to 16; and semi-volatile organic compounds (SVOC) having a typical boiling point of about 260° C. to about 400° C. and a carbon number of 16 or more.

The melting point of a thermoplastic polymer, unless otherwise specified, is determined by ASTM E794-06(2018) with 10° C./min ramping and cooling rates.

The softening temperature or softening point of a thermoplastic polymer, unless otherwise specified, is determined by ASTM D6090-17. The softening temperature can be measured by using a cup and ball apparatus available from Mettler-Toledo using a 0.50 gram sample with a heating rate of 1° C./min.

VOC emissions from polymer filaments and additive manufacturing processes disclosed herein may be determined using any suitable technique for detecting emissions from materials and products. In one method, VOCs may be detected by gas chromatography and/or mass spectroscopy, during which VOCs may be measured under heating conditions that simulate additive manufacturing conditions used to promote consolidation of a part. For example, to determine VOCs, a sample may be heated from 230° C. to 260° C. at a ramp of 3° C./min and volatiles are collected and analyzed over this temperature span. The resulting data is reported as total TVOC in units of µg per gram of sample.

Other suitable methods for measuring VOC emissions may include ASTM D5116-17 and UL 2904—Method for Testing and Assessing Particle and Chemical Emissions from 3D Printers. Instrumentation that may be utilized to measure TVOC include any suitable system for quantifying volatile organics such as halocarbons, alcohols, terpenes, aldehydes, ketones, ethers, siloxanes, and the like. Testing systems may include, but are not limited to, liquid chromatography—mass spectrometry (LC-MS), gas chromatography-mass spectrometry (GCMS), liquid chromatography with tandem mass spectrometry (LC/MS/MS), gas chromatography with tandem mass spectrometry (GC/MS/MS), or high performance liquid chromatography with tandem mass spectrometry (HPLC-LC/MS/MS), gas chromatography with tandem mass spectrometry in electron capture negative ionization mode (GC/MSECNI), and the like.

Figure 1:
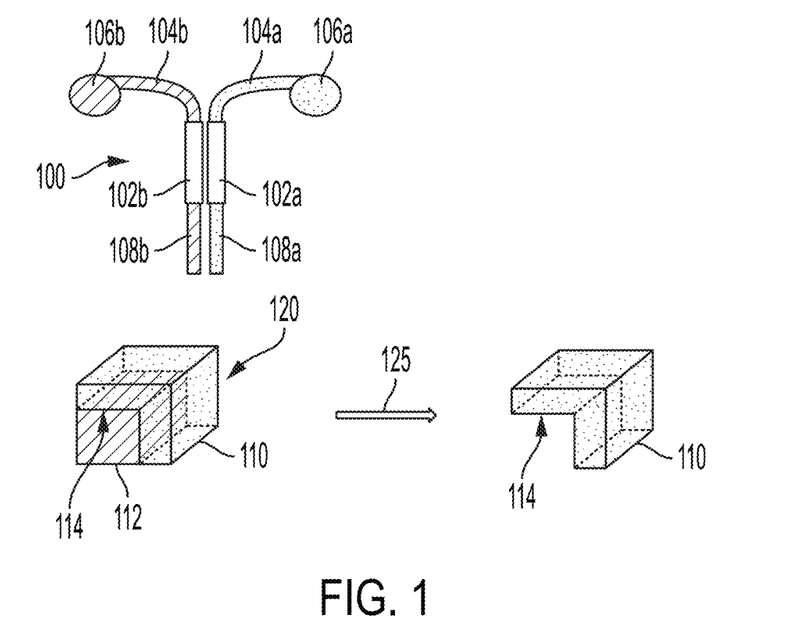
FIG. 1 is a diagram of an illustrative fused filament fabrication process for producing a printed part using a build material and a removable support material.

Before addressing various aspects of the present disclosure in further detail, a brief discussion of additive manufacturing processes, particularly fused filament fabrication processes, will first be provided so that the features of the present disclosure can be better understood. FIG. 1 shows a schematic of an illustrative fused filament fabrication process for producing a part using a build material and a removable support material. As shown in FIG. 1, print head 100 includes first extruder 102a and second extruder 102b, which are each configured to receive a filamentous printing material. Specifically, first extruder 102a is configured to receive first filament 104a from first payout reel 106a and provide molten stream 108a of a first printing material, and second extruder 102b is configured to receive second filament 104b from second payout reel 106b and provide molten stream 108b of a second printing material.

Figure 2:
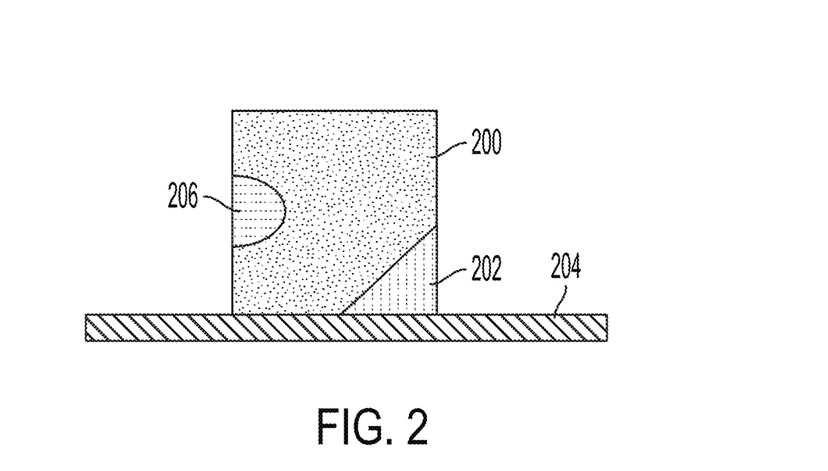
FIG. 2 is a diagram of an illustrative printed part having overhangs.

Both molten streams are initially deposited upon a print bed (not shown in FIG. 1) to promote layer-by-layer growth of supported part 120. The first printing material (build material) supplied by first extruder 102a may be a polymer used to fabricate part 110, and the second printing material (removable support material) supplied by second extruder 102b may be a dissolvable or degradable polymer, a sacrificial material, which is used to fabricate removable support 112 under overhang 114. Overhang 114 is not in direct contact with the print bed or a lower printed layer formed from the build material. In the part arrangement shown in FIG. 1, removable support 112 is interposed between overhang 114 and the print bed, but it is to be appreciated that in alternatively configured parts, removable support 114 may be interposed between two or more portions of part 110. FIG. 2, for example, shows illustrative part 200, in which removable support 202 is interposed between an overhang defined between part 200 and print bed 204, and removable support 206 is interposed between two portions of part 200.

Referring again to FIG. 1, once printing of printed part 110 and removable support 112 is complete, supported part 120 may be subjected to support removal conditions 125 that result in elimination of removable support 112 (e.g., dissolution or disintegration conditions, or the like) and leave printed part 110 with overhang 114 unsupported thereon. Support removal conditions 125 may include, for example, contact of supported part 120 with a solvent or other liquid medium in which removable support 112 is dissolvable or degradable and printed part 110 is not. Removable support 112 may comprise a different thermoplastic polymer than does printed part 110 in order to support selective dissolution or degradation.

If a printed part is being formed without an overhang or similar feature, it is not necessary to utilize a removable support material during fabrication of the printed part. Similarly, two or more different build materials may be utilized as well, such as when one or more of the build materials is structural in nature and one or more of the build materials is functional in nature. In non-limiting examples, a structural polymer may be concurrently printed with a bio-based additive admixed therewith, in accordance with the present disclosure.

Polymer filaments of the present disclosure that are suitable for fused filament fabrication disclosed may include a thermoplastic polymer, and a bio-based additive admixed with the thermoplastic polymer in an effective amount to decrease total volatile organic compound (TVOC) emissions under additive manufacturing conditions, such as during fused filament fabrication. It is to be appreciated that the concepts disclosed herein may also be applicable to additive manufacturing processes employing particulate consolidation as well. The decreased TVOC emissions may be measured relative to the thermoplastic polymer alone, with the decrease in TVOC being at least about 10% on a weight basis. TVOC measurements, and the decrease thereof, may be measured by gas chromatography and/or mass spectroscopy under heating conditions that simulate additive manufacturing conditions. Particularly, TVOC measurements may be obtained by heating a sample from 230° C. to 260° C. at a ramp of 3° C./min, and collecting and analyzing volatiles emitted over this temperature span. The resulting data may be reported as total TVOC in units of μg per gram of sample.

Polymer filaments suitable for additive manufacturing may range from about 0.5 mm to about 10 mm in diameter, or about 1 mm to about 5 mm in diameter, particularly about 1.5 mm to about 3.5 mm in diameter. Standard filament diameters for many three-dimensional printers employing fused filament fabrication technology are 1.75 mm or 2.85 mm (about 3.0 mm). While a number of general ranges are provided, the polymer filament diameter may be dimensioned in accordance with the drive system for a selected printer system without departing from the scope of the present disclosure. Similarly, the length and/or color of the filaments is/are not believed to be particularly limited in the processes disclosed herein. Preferably, the polymer filaments disclosed herein are continuous and of spoolable length, such as at least about 0.3 m, or at least about 2 m, or at least about 3 m, or at least about 4 m, or at least about 10 m, or at least about 30 m, or at least about 60 m, or at least about 100 m, or at least about 200 m.

Other properties that may determine if a polymer filament is suitable for additive manufacturing, particularly fused filament fabrication, include a temperature required to extrude the filament that is not be undesirably high. A suitable filament for fused filament fabrication may minimize printing issues, such as oozing from the print nozzle or clogging of the print nozzle. Suitable materials for inclusion in the polymer filaments disclosed herein may form parts that easily separate from a print bed, have sufficient mechanical strength once printed, and exhibit good interlayer adhesion. Additional characteristics of suitable polymer filaments are specified below.

Thermoplastic polymers suitable for inclusion within polymer filaments of the disclosure herein are not considered to be particularly limited, provided that the bio-based additive may be admixed therewith via a suitable blending process, such as melt blending, in an amount effective to decrease TVOC under additive manufacturing conditions. Some examples of suitable thermoplastic polymers may exhibit a softening temperature or melting point sufficient to facilitate deposition at a temperature ranging from about 50° C. to about 400° C., or about 70° C. to about 275° C., or from about 100° C. to about 200° C., or from about 175° C. to about 250° C. Melting points may be determined using ASTM E794-06 (2018) with a 10° C. ramping and cooling rate, and softening temperatures may be determined using ASTM D6090-17.

Illustrative examples of suitable thermoplastic polymers may include those commonly employed in fused filament fabrication such as, for instance, a polyamide, a polycaprolactone, a polylactic acid, a poly(styrene-isoprene-styrene) (SIS), a poly(styrene-ethylene-butylene-styrene) (SEBS), a poly(styrene-butylene-styrene) (SBS), a high-impact polystyrene (HIPS), polystyrene, a thermoplastic polyurethane, a poly(acrylonitrile-butadiene-styrene) (ABS), a polymethylmethacrylate, a poly(vinylpyrrolidine-vinylacetate), a polyester, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), polyvinylpyrrolidone-co-polyvinyl acetate (PVP-co-PVA), any copolymer thereof, and any combination thereof. In some examples, the thermoplastic polymer may be a styrenic polymer, such as poly(acrylonitrile-butadiene-styrene). In other specific examples, the thermoplastic polymer is not a polylactic acid.

Bio-based additives suitable for incorporation in the polymer filaments disclosed herein may include biologically-derived materials having various compositions and concentrations of carbonaceous compounds, including, but not limited to, cellulose, hemicellulose, lignin, proteins, and the like. Following sourcing, suitable bio-based additives may undergo one or more pre-processing operations prior to being blended with a thermoplastic polymer, such as sanitizing and/or sterilizing by physical or chemical methods, clarification, grinding, sieving, sorting, pressing to remove excess oils, washing, solvent extraction to remove organics, drying, and the like.

Pre-processing of the bio-based additives may include removal of water therefrom (dehydration) by any suitable method(s) to remove excess fluids and moisture, including dehydration by air drying, vacuum drying and/or freeze drying (lyophilization). Suitable bio-based additives may comprise a water content, optionally after pre-processing, of about 0.1 wt. % or less, or about 0.5 wt. % or less, or about 1 wt. % or less.

Pre-processing of bio-based additives may additionally or alternately include reducing a particle size of the bio-based additives by any suitable method such as cutting, grinding, cryogenic grinding, milling, crushing, pulverizing, sonication, homogenization, and similar particle size reduction techniques. Particle size reduction may aid in enhancing dispersion of the bio-based additive within a thermoplastic polymer during melt blending. Bio-based additives suitable for use in the disclosure herein may have an average particle size in a micrometer or nanometer size range. In particular examples, suitable bio-based additives may have an average ($D_{50}$) particle size of about 16 µm or less, or about 14 µm or less, or about 10 µm or less. Some examples of bio-based additives may have an average ($D_{50}$) particle size in a range of about 0.1 µm to about 20 µm, about 0.4 µm to about 14 µm, or about 0.4 µm to about 10 µm. Such average particle size measurements may be made by analysis of optical images, including via SEM analysis, or using onboard software of a Multisizer 3 by Beckman Coulter. While a number of particle sizes and ranges are provided, the particle sizes may be larger or smaller depending on application-specific needs, such as requirements for feeding to a selected additive manufacturing platform, the nature of the thermoplastic polymer, and the like.

Bio-based additives suitable for use in the disclosure herein may include grains, processed grains, grain wastes, and grain by-products. Examples may include, but are not limited to, distiller's products, brewer's spent grain, corn gluten, sorghum germ cake and meal, peanut skins, wheat bran. Suitable grains, grain waste, and the like may be derived from any one or more of barley, corn, oats, rice, sorghum, wheat, any mixture thereof, and the like. Some polymer filaments of the present disclosure may include brewer's spent grain, which may be derived from beer brewing processes. Additional bio-based additives suitable for use in the disclosure herein may include coffee beans and coffee bean grounds (including used coffee grounds). These bio-based additives may be used alone or in combination with grains, grain waste, or the like in the polymer filaments disclosed herein.

Still other bio-based additives may include plant protein products such as canola meal, cottonseed cakes and meals, safflower meal, and soybean (including organic and genetically modified soybean) feed and meal, and the like; fibrous materials like plant materials such as alfalfa, birdsfoot trefoil, brassicas (e.g., chau moellier, kale, rapeseed (canola), rutabaga, and turnip, grass (e.g., false oat grass, fescue, Bermuda grass, brome, heath grass, meadow grass, orchard grass, ryegrass, and Timothy grass), millet, and soybeans; hulls and fibrous materials such as grasses, rice hulls, cotton, jute, hemp, flax, bamboo, sisal, abaca, straw, corn cobs, rice hulls, coconut hair, algae, seaweed, water hyacinth, cassava, bagasse, almond hulls, ground shells, buckwheat hulls, legumes, synthetic celluloses, and the like, processed and recycled paper products, wood, wood-related materials, particle board, and the like.

The loading of the bio-based additive in the polymer filaments disclosed herein may be adjusted to achieve a desired extent of TVOC reduction. In illustrative examples, the bio-based additives may be present in an effective amount to achieve at least about 10% TVOC reduction, or about 25% TVOC reduction, or at least about 40% TVOC reduction, or at least about 60% TVOC reduction, or at least about 80% TVOC reduction. The reduction percentage may be determined by the expression| $TVOC_{poly} - TVOC_{fil}$|/$TVOC_{poly}$, wherein $TVOC_{poly}$ is TVOC of the polymer alone and $TVOC_{fil}$ is TVOC of the polymer filament containing the bio-based additive. In some examples, the bio-based additive may be included the polymer filaments of the present disclosure (or a polymer melt used to form the polymer filaments) at about 0.5 wt. % or more, or about 1 wt. % or more, or about 2 wt. % or more, or about 5 wt. % or more, or about 10 wt. % or more. In more specific examples, the bio-based additives may be present in the polymer filaments (or polymer melts used to form the polymer filaments) in an amount ranging from about 0.5 wt. % to about 10 wt. %, or about 0.5 wt. % to about 7.5 wt. %, or about 1 wt. % to about 5 wt. %, or about 1 wt. % to about 4 wt. %. While a number of ranges are provided as examples, the loading of the bio-based additive may be selected such that the polymer filament maintains structural integrity as a continuous filament and remains printable by fused filament fabrication, while still decreasing TVOC emission during additive manufacturing, as specified herein.

Polymer filaments of the present disclosure may be formed though melt blending processes. Suitable melt blending processes may take place through melt mixing of the thermoplastic polymer and the bio-based additive, followed by extrusion of the resulting melt blend. As another option, melt blending may take place directly via extrusion with an extruder. During filament extrusion, the thermoplastic polymers may be melt blended within an extruder, such as a single screw or multi-screw extruder, with one or more bio-based additives and additional optional additives, and mechanically passed through a die. The molten polymer blend may be dimensioned according to one or more openings in the die to form a continuous polymer filament. As the polymer filament cools, it may be collected and spooled into a form suitable for end use applications such as feeding a printing device for fused filament fabrication. In addition, melt blended polymer compositions may also be converted to other forms, including pelletized forms, depending on the application, without departing from the present disclosure.

Accordingly, methods for forming a polymer filament according to the present disclosure may comprise: forming a melt blend comprising a thermoplastic polymer and a bio-based additive, and extruding the melt blend and cooling to form a polymer filament comprising the bio-based additive admixed with the thermoplastic polymer, in which the bio-based additive is present in an effective amount to decrease TVOC emissions under additive manufacturing conditions, as determined by gas chromatography and measured relative to the thermoplastic polymer alone, by at least about 10% on a weight basis.

Additive manufacturing processes taking place by fused filament fabrication according to the present disclosure may comprise providing a polymer filament described herein, heating the polymer filament above a softening temperature thereof to form a softened polymer material, and depositing the softened polymer material layer by layer to form a printed part. The polymer filament may be deposited layer-by-layer by itself or in combination with a suitable removable support material (sacrificial material) also deposited from a continuous filament to form a printed part. Suitable types of parts are not considered to be particularly limited in the present disclosure.

In some fused filament fabrication methods, the print head may contain one or more extruders, such that a first polymer filament comprising a build material is deposited from a first extruder. The build material may include a polymer filament in accordance with the disclosure above. Optionally, a second polymer filament containing a removable support material (sacrificial material) may be deposited from a second extruder to form a removable support for defining one or more overhangs in a printed part formed from the build material. A second build material may alternately be deposited in conjunction with the polymer filaments disclosed herein as well.

Although polymer filaments may be particularly advantageous when formed according to the disclosure herein, it is to be appreciated that polymer compositions comprising a bio-based additive may be formed into other shapes following melt blending, including pellets or particles. For example, a thermoplastic polymer and one or more bio-based additives may be combined by melt blending, followed by extrusion to larger fiber forms, which may then be cut, shredded, pulverized, or the like to afford polymer pellets or polymer powder, each containing a bio-additive admixed with the polymer. The morphology of the polymer pellets or polymer powder may be similar to that of the polymer filaments that are suitable for additive manufacturing. Like polymer filaments, the polymer pellets or polymer powder may be subsequently processed into printed parts under suitable additive manufacturing conditions.

In addition to additive manufacturing, polymer pellets (or other polymer compositions) incorporating a thermoplastic polymer and a bio-based additive admixed therewith in an effective amount to decrease TVOC emissions may be applicable to other manufacturing techniques such as, for example, extrusion molding, coextrusion molding, extrusion coating, injection molding, injection blow molding, inject stretch blow molding, thermoforming, cast film extrusion, blown film extrusion, foaming, extrusion blow-molding, injection stretched blow-molding, rotomolding, pultrusion, calendering, lamination, and the like.

Embodiments disclosed herein include:

A. Polymer filaments compatible with fused filament fabrication. The polymer filaments comprise: a thermoplastic polymer; and a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis.

B. Methods for forming a polymer filament compatible with fused filament fabrication. The methods comprise: forming a melt blend comprising a thermoplastic polymer and a bio-based additive; and extruding the melt blend and cooling to form a polymer filament comprising the bio-based additive admixed with the thermoplastic polymer; wherein the bio-based additive is present in an effective amount to decrease total volatile organic compound (TVOC) emissions under additive manufacturing conditions, as determined by gas chromatography and measured relative to the thermoplastic polymer alone, by at least about 10% on a weight basis.

C. Additive manufacturing processes. The additive manufacturing processes comprise: providing a polymer filament comprising a thermoplastic polymer and a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis; heating the polymer filament above a softening temperature of the thermoplastic polymer to form a softened polymer material; and depositing the softened polymer material layer by layer to form a printed part.

Each of embodiments A, B, and C may have one or more of the following additional elements in any combination:

Element 1: wherein the bio-based additive is present in an effective amount to decrease TVOC emissions by at least about 25% on a weight basis.

Element 2: wherein the bio-based additive is admixed with the thermoplastic polymer at about 1 wt. % or more based on total mass.

Element 3: wherein the bio-based additive is freeze-dried.

Element 4: wherein the bio-based additive comprises about 1 wt. % or less water.

Element 5: wherein the bio-based additive has an average particle size of about 14 μm or less.

Element 6: wherein the bio-based additive has an average particle size of about 0.4 μm to about 14 μm.

Element 7: wherein the bio-based additive comprises coffee grounds, grain waste, or any combination thereof.

Element 8: wherein the bio-based additive comprises brewer's spent grain.

Element 9: wherein the thermoplastic polymer comprises a polymer selected from the group consisting of a polyamide, a polycaprolactone, a poly(styrene-isoprene-styrene) (SIS), a poly(styrene-ethylene-butylene-styrene) (SEBS), a poly(styrene-butylene-styrene) (SBS), a high-impact polystyrene, a polystyrene, a thermoplastic polyurethane, a poly(acrylonitrile-butadiene-styrene) (ABS), a polymethylmethacrylate, a poly(vinylpyrrolidine-vinylacetate), a polyester, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), any copolymer thereof, and any combination thereof.

Element 10: wherein the thermoplastic polymer is a poly(acrylonitrile-butadiene-styrene) polymer.

Element 11: wherein the thermoplastic polymer is not a polylactic acid.

By way of non-limiting example, exemplary combinations applicable to A, B and C include, but are not limited to, 1 and 2; 1, and 3 or 4; 1, and 5 or 6; 1, and 7 or 8; 1 and 9; 1 and 10; 1 and 11; 2, and 3 or 4; 2, and 5 or 6; 2, and 7 or 8; 2 and 9; 2 and 10; 2 and 11; 3 or 4, and 5 or 6; 3 or 4, and 7 or 8; 3 or 4, and 9; 3 or 4, and 10; 3 or 4, and 11; 5 or 6, and 7 or 8; 5 or 6, and 9; 5 or 6, and 10; 5 or 6, and 11; 7 or 8, and 9, 7 or 8, and 10; 7 or 8, and 11; 9 and 10; 9 and 11; and 10 and 11.

To facilitate a better understanding of the present disclosure, the following examples of preferred or representative embodiments are given. In no way should the following examples be read to limit, or to define, the scope of the invention.

EXAMPLES

In the following examples, polymer filaments were prepared with poly(acrylonitrile-butadiene-styrene) (ABS) polymer admixed with selected bio-based additives, as specified further below. Sample polymer filaments were prepared using a Filabot EX6 filament device equipped with a single screw extruder within a barrel heated at 185° C. Sample components were loaded and admixed within the device, and filaments were extruded through a 2.85 mm die, air cooled, and wound on a spool.

Comparative Sample. A Comparative Sample polymer filament was prepared by extruding ABS alone. The filament was white in color.

Sample 1: ABS-Brewer's Spent Grains (Beer Brewing Waste). The Sample 1 polymer filament was formulated from ABS containing 4 wt. % brewer's spent grains (beer brewing waste). Prior to being combined with the ABS, the brewer's spent grains were dehydrated by freeze drying for three days to a moisture content of <1%. Dried grounds were then transferred to a bladed grinder, ground, and sieved over a 58 μm screen. Particles exhibited a $D_{50}$ diameter of <14 μm as determined by particle analyses using a Multisizer 3 (Beckman Coulter). Filaments that were obtained exhibited a light brown color, with some speckling observed at the surface from the bio-based additive.

Sample 2: ABS-Spent Coffee Grounds. The Sample 2 polymer filament was formulated from ABS containing 4 wt. % spent coffee grounds. Prior to being combined with the ABS, the spent coffee grounds were dried using a dehydrator for 24 hours to a moisture content of <1%. Dried grounds were then transferred to a bladed grinder, ground, and sieved over a 58 μm screen. Particles exhibited a $D_{50}$ diameter of <11 μm as determined by particle analyses using a Multisizer 3 (Beckman Coulter). Filaments that were obtained exhibited a light brown color, with some speckling observed at the surface from the bio-based additive.

Figure 3A:
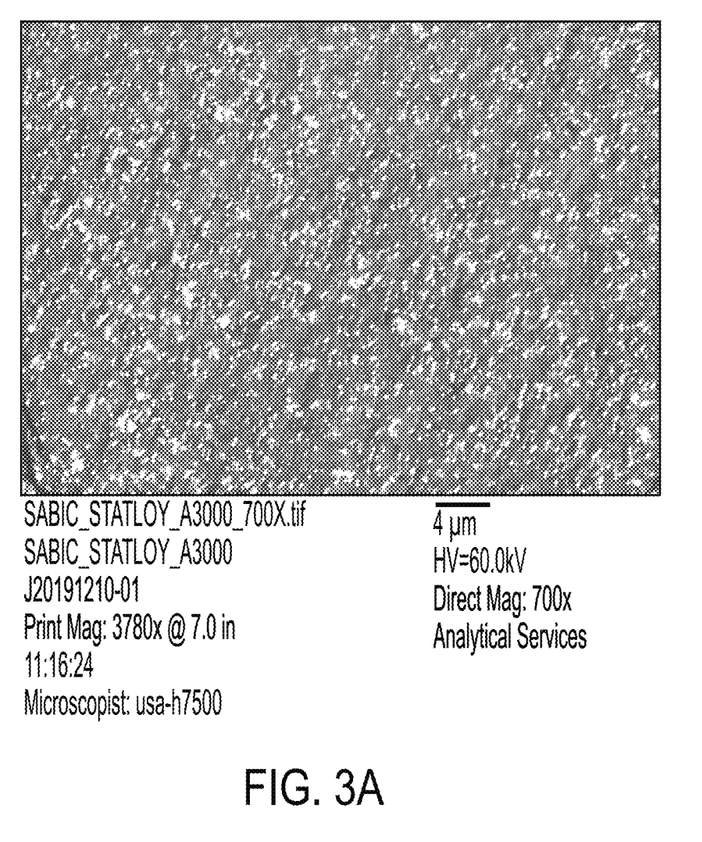
FIGS. 3A, 3B and 3C show TEM images of comparative and example filaments of the present disclosure.
Figure 3B:
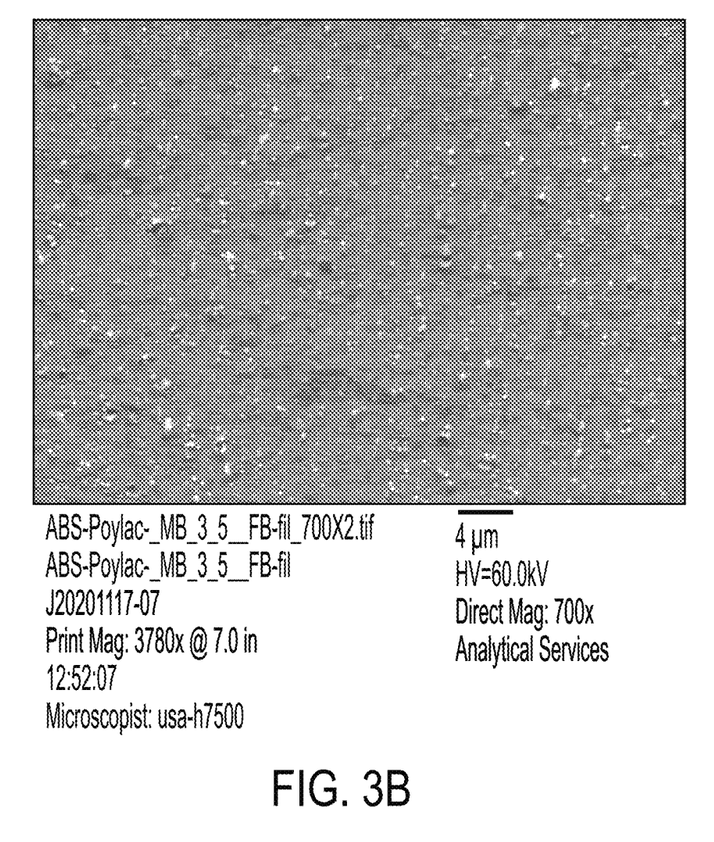
Figure 3C:
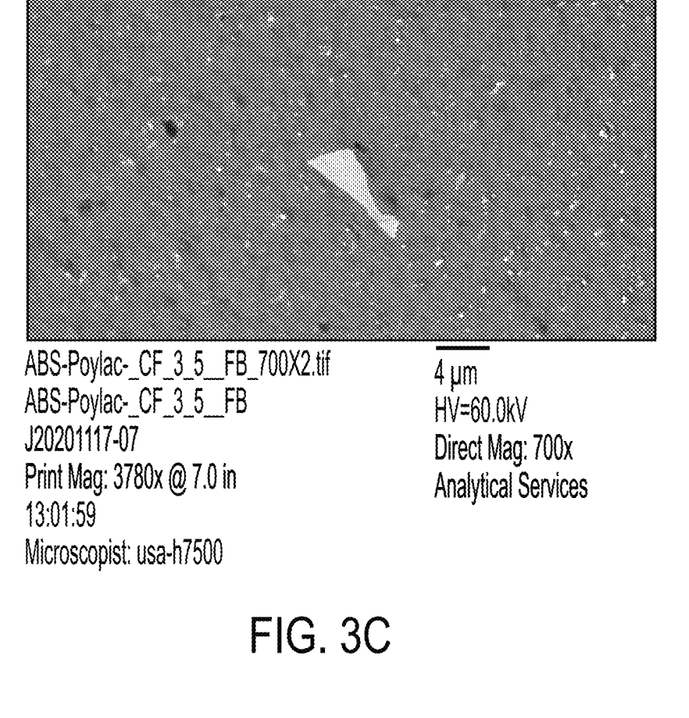

FIGS. 3A, 3B and 3C show transmission electron microscopy (TEM) images of the filaments of the Comparative Sample, Sample 1 and Sample 2. White portions of the TEM images are indicative of porosity in the filaments. As shown, the samples containing bio-based additives exhibited a lower degree of porosity, with Sample 2 visually exhibiting the lowest porosity.

Test Coupons. Dog bone test coupons for Sample 1, Sample 2 and the Comparative Sample were produced according to ASTM D638-14 using an Ultimizer S5 3-D printer. Printing was conducted at a print head temperature of 240° C., a bed temperature of 80° C. and at a 0.2 mm line height. Tensile strength of the test coupons was measured by ASTM D638. All samples provided similar mechanical property performance.

TVOC Measurements. The polymer filaments were analyzed under heating conditions intended to mimic additive manufacture conditions suitable for printing ABS filaments. Under the simulated additive manufacturing conditions, the samples were heated from 230° C. to 260° C. at a ramp of 3° C./min, and volatiles were collected during this temperature span to determine TVOC emissions. TVOC emissions were measured by combined gas chromatography/mass spectroscopy.

The measured TVOC emissions are summarized in Table 1 below. The measured TVOC for the Comparative Sample was used to determine the percentage difference and percentage decrease in TVOC emissions for Samples 1 and 2. The percentage decrease was determined by the expression| $TVOC_{poly}-TVOC_{fil}|/TVOC_{poly}$ and the percentage difference was determined by the expression $TVOC_{poly}-TVOC_{fil}|/(TVOC_{poly}+TVOC_{fil})/2$, wherein $TVOC_{poly}$ is TVOC of the polymer alone and $TVOC_{fil}$ is TVOC of the polymer filament containing the bio-based additive.

TABLE 1

| Sample # | Comparative | 1 | 2 |
| --- | --- | --- | --- |
| TVOC (μg/g) | 2728 | 1130 | 1060 |
| Percentage Difference | — | 83% | 88% |
| Percentage Decrease | — | 59% | 61% |

The individual reduction of styrene with respect to the Comparative Sample was also analyzed by GC/MS, indicating a percent reduction of 38% for each of Samples 1 and 2 under additive manufacturing conditions, as shown in Table 2.

TABLE 2

| Sample # | Comparative | 1 | 2 |
| --- | --- | --- | --- |
| Styrene VOC ($10^7$ μg) | 6.5 | 4 | 4 |
| Percent Difference | — | 38% | 38% |

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A polymer filament compatible with fused filament fabrication, comprising:
   a thermoplastic polymer;
      wherein the thermoplastic polymer is not a polylactic acid; and
   a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis;
      wherein 1) the bio-based additive comprises coffee grounds, grain waste, or any combination thereof, and the thermoplastic polymer is a poly(acrylonitrile-butadiene-styrene) polymer, or 2) the bio-based additive comprises brewer's spent grain;
      wherein the bio-based additive is admixed with the thermoplastic polymer at about 0.05 wt. % to about 10 wt. % based on total mass, and
      wherein the polymer filament has a diameter ranging from about 1.5 mm to about 3.5 mm.

2. The polymer filament of claim 1, wherein the bio-based additive comprises about 1 wt. % or less water.

3. The polymer filament of claim 1, wherein the bio-based additive has an average particle size of about 14 μm or less.

4. A method for forming a polymer filament compatible with fused filament fabrication, comprising:
   forming a melt blend comprising a thermoplastic polymer and a bio-based additive;
      wherein the thermoplastic polymer is not a polylactic acid; and
   extruding the melt blend and cooling to form a polymer filament comprising the bio-based additive admixed with the thermoplastic polymer;
      wherein 1) the bio-based additive comprises coffee grounds, grain waste, or any combination thereof, and the thermoplastic polymer comprises a poly(acrylonitrile butadiene styrene) polymer or 2) the bio-based additive comprises brewer's spent grain;
      wherein the polymer filament has a diameter ranging from about 1.5 mm to about 3.5 mm;
      wherein the bio-based additive is present in an effective amount to decrease total volatile organic compound (TVOC) emissions under additive manufacturing conditions, as determined by gas chromatography and measured relative to the thermoplastic polymer alone, by at least about 10% on a weight basis; and
      wherein the bio-based additive is admixed with the thermoplastic polymer at about 0.05 wt. % to about 10 wt. % based on total mass.

5. The method of claim 4, wherein the bio-based additive comprises about 1 wt. % or less water.

6. The method of claim 4, wherein the bio-based additive has an average particle size of about 14 μm or less.

7. An additive manufacturing process, comprising:
   providing a polymer filament comprising a thermoplastic polymer and a bio-based additive admixed with the thermoplastic polymer in an effective amount to decrease total volatile organic compound (TVOC) emissions under additive manufacturing conditions, as determined by gas chromatography and measured relative to the thermoplastic polymer alone, by at least about 10% on a weight basis;
      wherein the thermoplastic polymer is not a polylactic acid;
      wherein the bio-based additive is admixed with the thermoplastic polymer at about 0.05 wt. % to about 10 wt. % based on total mass;
      wherein 1) the bio-based additive comprises coffee grounds, grain waste, or any combination thereof, and the thermoplastic polymer comprises a poly(acrylonitrile butadiene styrene) polymer or 2) the bio-based additive comprises brewer's spent grain; and
      wherein the polymer filament has a diameter ranging from about 1.5 mm to about 3.5 mm;
   heating the polymer filament above a softening temperature of the thermoplastic polymer to form a softened polymer material; and
   depositing the softened polymer material layer by layer to form a printed part.

* * * * *